US012601489B2

(12) United States Patent
Shershnyov

(10) Patent No.: US 12,601,489 B2
(45) Date of Patent: Apr. 14, 2026

(54) NOZZLE ASSEMBLY, COMBUSTOR AND GAS TURBINE COMPRISING THE SAME

(71) Applicant: DOOSAN ENERBILITY CO., LTD., Changwon-si (KR)

(72) Inventor: Borys Shershnyov, Changwon-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 2 days.

(21) Appl. No.: 18/402,414

(22) Filed: Jan. 2, 2024

(65) Prior Publication Data

US 2024/0219029 A1 Jul. 4, 2024

(30) Foreign Application Priority Data

Jan. 2, 2023 (KR) ........................ 10-2023-0000313

(51) Int. Cl.
| | |
|---|---|
| *F23R 3/00* | (2006.01) |
| *F02C 7/22* | (2006.01) |
| *F23R 3/28* | (2006.01) |

(52) U.S. Cl.
CPC ................ *F23R 3/286* (2013.01); *F02C 7/22* (2013.01); *F05D 2240/35* (2013.01)

(58) Field of Classification Search
None
See application file for complete search history.

(56) References Cited

U.S. PATENT DOCUMENTS

| | | | |
|---|---|---|---|
| 11,680,708 B2 | 6/2023 | Seok | |
| 2001/0052229 A1 | 12/2001 | Tuthill et al. | |
| 2011/0000214 A1* | 1/2011 | Helmick | ................... F23R 3/14 |
| | | | 60/734 |
| 2011/0113783 A1* | 5/2011 | Boardman | .............. F23R 3/286 |
| | | | 60/737 |

(Continued)

FOREIGN PATENT DOCUMENTS

| | | |
|---|---|---|
| JP | 2017150806 A | 8/2017 |
| KR | 20190109955 A | 9/2019 |

(Continued)

OTHER PUBLICATIONS

European search report received for European Application No. 24150056.0, mailed on Apr. 16, 2024, 8 pages.

*Primary Examiner* — Edwin Kang
(74) *Attorney, Agent, or Firm* — SHOOK, HARDY & BACON L.L.P.

(57) ABSTRACT

Proposed are a nozzle assembly, a combustor using the same, and a gas turbine. The nozzle assembly is configured to inject fuel and compressed air into a combustion chamber of a combustor of a gas turbine, and includes a hollow nozzle frame, a mixture supply tube having a plurality of tubes configured to supply a mixture of air and fuel to the combustion chamber, a fuel supply part configured to supply fuel to the mixture supply tube, an air supply part configured to supply air to the mixture supply tube, and a mixing part including an injection member formed in each of the tubes and configured to inject fuel supplied from the fuel supply (Continued)

3400

3452

3433 3452a 3452b

3433

3451b 3451a

3451

- - - ▶ Air
——▶ Fuel part toward air passing through the tube, and a swirl vane formed on one side of the injection member and configured to mix fuel and air passing through the injection member.

10 Claims, 8 Drawing Sheets

(56) References Cited

U.S. PATENT DOCUMENTS

| | | | |
|---|---|---|---|
| 2013/0086910 A1* | 4/2013 | Khan | F23R 3/14 |
| | | | 60/737 |
| 2014/0096502 A1 | 4/2014 | Karlsson et al. | |
| 2014/0157779 A1* | 6/2014 | Uhm | F23R 3/10 |
| | | | 60/725 |
| 2016/0281990 A1* | 9/2016 | Stuttaford | F23R 3/14 |
| 2019/0264921 A1 | 8/2019 | Doh et al. | |
| 2020/0400314 A1* | 12/2020 | Binek | F02C 7/16 |

FOREIGN PATENT DOCUMENTS

| | | |
|---|---|---|
| KR | 102153014 B1 | 9/2020 |
| KR | 102189308 B1 | 12/2020 |
| KR | 1020220104492 | 7/2022 |
| KR | 20220114937 A | 8/2022 |
| KR | 1020220151688 | 11/2022 |
| KR | 10-2474179 B | 12/2022 |
| KR | 102481970 B1 | 12/2022 |
| WO | 2022/176302 A1 | 8/2022 |

* cited by examiner

NOZZLE ASSEMBLY, COMBUSTOR AND GAS TURBINE COMPRISING THE SAME

CROSS REFERENCE TO RELATED APPLICATION

The present application claims priority to Korean Patent Application No. 10-2023-0000313, filed on Jan. 2, 2023, the entire contents of which are incorporated herein for all purposes by this reference.

BACKGROUND

Technical Field

The present disclosure relate to a nozzle assembly, a combustor, and a gas turbine including the same. More particularly, the present disclosure relate to a nozzle assembly provided in a combustor of a gas turbine and configured to mix and inject fuel and compressed air into a combustion chamber of the combustor, a combustor using the same, and a gas turbine.

Description of the Background Art

A turbo machine refers to an apparatus that generates a driving force used to generate electric power by using fluid (especially, gas) passing through the turbo machine. Therefore, such a turbo machine is usually installed and used together with a generator. The turbo machine may include a gas turbine, a steam turbine, and a wind power turbine. The gas turbine is an apparatus that generates combustion gas by mixing compressed air and natural gas and by combusting the mixture, and generates a driving force for generation of electric power by using the combustion gas. The steam turbine is an apparatus that heats water to generate steam and generates a driving force for generation of electric power by using the steam. The wind power turbine is an apparatus that converts wind power into a driving force for generation of electric power.

In the turbo machine, the gas turbine includes a compressor, a combustor, and a turbine. The compressor includes multiple compressor vanes and multiple compressor blades which are alternately disposed in a compressor casing. In addition, the compressor is configured to intake external air through a compressor inlet scroll strut. The intaken air is compressed by the compressor vanes and the compressor blades while passing through an inner portion of the compressor. The combustor receives compressed air compressed in the compressor, and mixes the compressed air with fuel.

In addition, the combustor ignites fuel mixed with compressed air by using an igniter, thereby generating high-temperature and high-pressure combustion gas. Such generated combustion gas is supplied to the turbine. The turbine includes a plurality of turbine vanes and a plurality of turbine blades which are alternately disposed in a turbine casing. In addition, the turbine receives combustion gas generated in the combustor, and passes the combustion gas through an inner portion of the turbine. The combustion gas passing through the inner portion of the turbine rotates the turbine blades, and the combustion gas that has completely passed through the inner portion of the turbine is discharged to an outside of the turbine through a turbine diffuser.

Looking at the steam turbine in the turbo machine, the steam turbine includes an evaporator and a turbine. The evaporator generates steam by heating water supplied from outside. Like the turbine of the gas turbine, the turbine of the steam turbine includes a plurality of turbine vanes and a plurality of turbine blades which are alternately disposed in the turbine casing. However, the turbine in the steam turbine passes steam generated by the evaporator rather than combustion gases through the inside thereof, thereby rotating the turbine blades.

Meanwhile, in such a turbo machine, the gas turbine may use hydrogen as fuel. In order to efficiently inject substances with a high flame speed, such as hydrogen, a structure that supplies fuel and air to a combustion chamber by using a plurality of tubes is proposed. In this way, the fuel injection structure using the plurality of tubes has the advantage of improving the mixing efficiency of fuel and gas and reducing the generation of nitrogen oxides since air and fuel flows are distributed through the plurality of tubes.

However, the conventional tubes with an axial flow structure have the problem that each of the tubes is required to have a relatively long length in order to have high mixing efficiency.

SUMMARY

Accordingly, the present disclosure has been made keeping in mind the above problems occurring in the related art, and an objective of the present disclosure is to provide a nozzle assembly, a combustor using the same, and a gas turbine, in which the mixing structure of fuel and air is improved to improve mixing efficiency thereof so that the overall length of a tube is decreased, thereby decreasing the overall size of a combustor and reducing the generation of nitrogen oxides.

In order to achieve the above objective, according to an embodiment of the present disclosure, there is provided a nozzle assembly configured to inject fuel and compressed air into a combustion chamber of a combustor of a gas turbine, the nozzle assembly including: a hollow nozzle frame; a mixture supply tube having a plurality of tubes configured to supply a mixture of air and fuel to the combustion chamber; a fuel supply part configured to supply fuel to the mixture supply tube; an air supply part configured to supply air to the mixture supply tube; and a mixing part including: an injection member formed in each of the tubes and configured to inject fuel supplied from the fuel supply part toward air passing through the tube, with the injection member including a hollow tube having a central flow path, through which the fuel and air flows, formed therein; and a swirl vane formed on one side of the injection member, with the swirl vane having a flow path formed in a center thereof such that the flow path communicates with the central flow path of the hollow tube and having blades formed on an outer surface thereof so that fuel and air supplied from an outside of the hollow tube mix with each other.

In addition, according to the present disclosure, there is provided the combustor configured to mix compressed air supplied from a compressor of the gas turbine with fuel and to combust a mixture of the compressed air and the fuel, the combustor being configured to supply a generated combustion gas to a turbine of the gas turbine, and the combustor including: a nozzle casing; a liner connected to an end portion of the nozzle casing adjacent to the turbine, the liner having an inner portion provided with a combustion chamber in which a mixture of compressed air and fuel is combusted; a transition piece connected to an end portion of the liner adjacent to the turbine, the transition piece being configured to supply a combustion gas generated from the combustion chamber to the turbine; and the nozzle assembly mounted inside the nozzle casing and configured to inject fuel and compressed air into the combustion chamber, wherein the nozzle assembly includes: the hollow nozzle frame; the mixture supply tube having a plurality of tubes configured to supply a mixture of air and fuel to the combustion chamber, the fuel supply part configured to supply fuel to the mixture supply tube; the air supply part configured to supply air to the mixture supply tube; and a mixing part including: the injection member formed in each of the tubes and configured to inject fuel supplied from the fuel supply part toward air passing through the tube, with the injection member including the hollow tube having a central flow path, through which the fuel and air flows, formed therein; and the swirl vane formed on one side of the injection member, with the swirl vane having a flow path formed in a center thereof such that the flow path communicates with the central flow path of the hollow tube and having blades formed on an outer surface thereof so that fuel and air supplied from an outside of the hollow tube mix with each other.

In addition, according to the present disclosure, there is provided the gas turbine including: the compressor configured to compress air introduced from outside; the combustor configured to mix compressed air supplied from the compressor with fuel and to combust a mixture of the compressed air and the fuel; and the turbine configured to generate power for generating electric power by passing combustion gas supplied from the combustor through an inner portion of the turbine, wherein the combustor includes: the nozzle casing; the liner connected to an end portion of the nozzle casing adjacent to the turbine, the liner having an inner portion provided with a combustion chamber in which the mixture of the compressed air and the fuel is combusted; the transition piece connected to an end portion of the liner adjacent to the turbine, the transition piece being configured to supply combustion gas generated from the combustion chamber to the turbine; and the nozzle assembly mounted inside the nozzle casing and configured to inject the fuel and the compressed air into the combustion chamber, wherein the nozzle assembly includes: the hollow nozzle frame; the mixture supply tube having a plurality of tubes configured to supply a mixture of air and fuel to the combustion chamber, the fuel supply part configured to supply fuel to the mixture supply tube; the air supply part configured to supply air to the mixture supply tube; and a mixing part including: the injection member formed in each of the tubes and configured to inject fuel supplied from the fuel supply part toward air passing through the tube, with the injection member including the hollow tube having a central flow path, through which the fuel and air flows, formed therein; and the swirl vane formed on one side of the injection member, with the swirl vane having a flow path formed in a center thereof such that the flow path communicates with the central flow path of the hollow tube and having blades formed on an outer surface thereof so that fuel and air supplied from an outside of the hollow tube mix with each other.

The fuel supply part of the present disclosure may include: a fuel supply tube disposed in a center of the nozzle frame and formed along a longitudinal direction of the nozzle frame; and a return member configured to move fuel supplied through the fuel supply tube to a rear side of the nozzle frame, and a fuel injection hole configured to allow the return member and the inside of the tube to communicate with each other may be formed in the injection member so that fuel supplied through the return member flows into the tube.

The injection member of the present disclosure may include: a first hollow tube disposed in a center of the tube;

and a plurality of supports formed in radial shapes outward from the first hollow tube, and the supports may include five supports and be disposed at equal angles from each other, and the fuel injection hole configured to inject fuel supplied from the return member may be formed in an upstream part of each of the supports.

A central axis of the fuel injection hole of the present disclosure may be formed to be inclined with respect to a central axis of the tube so that fuel is injected toward the center of the tube.

The swirl vane of the present disclosure may include: a second hollow tube communicating with the first hollow tube; and a plurality of blades formed in spiral shapes on an outer circumferential surface of the second hollow tube.

A fuel supply hole configured to allow the fuel supply part and the tube of the present disclosure to communicate with each other and to supply fuel of the fuel supply part to the tube may be formed in the tube, and a central axis of the fuel supply hole may be formed to be inclined with respect to a central axis of the tube so that fuel is injected toward a center of the tube.

In the nozzle assembly, the combustor using the same, and the gas turbine according to the present disclosure, the mixing structure of fuel and air is improved to improve mixing efficiency so that the overall length of a tube is decreased, thereby decreasing the overall size of the combustor and reducing the generation of nitrogen oxides.

In addition, in the nozzle assembly according to the present disclosure, mixing efficiency is improved, thereby increasing flame stability.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings. Prior to this, terms and words used in this specification and claims should not be construed as limited to their usual or dictionary meanings, and based on the principle that the inventor can appropriately define the concepts of the terms in order to explain his or her invention in the best way, the terms are required to be interpreted as meanings and concepts consistent with the technical idea of the present disclosure.

Figure 1:
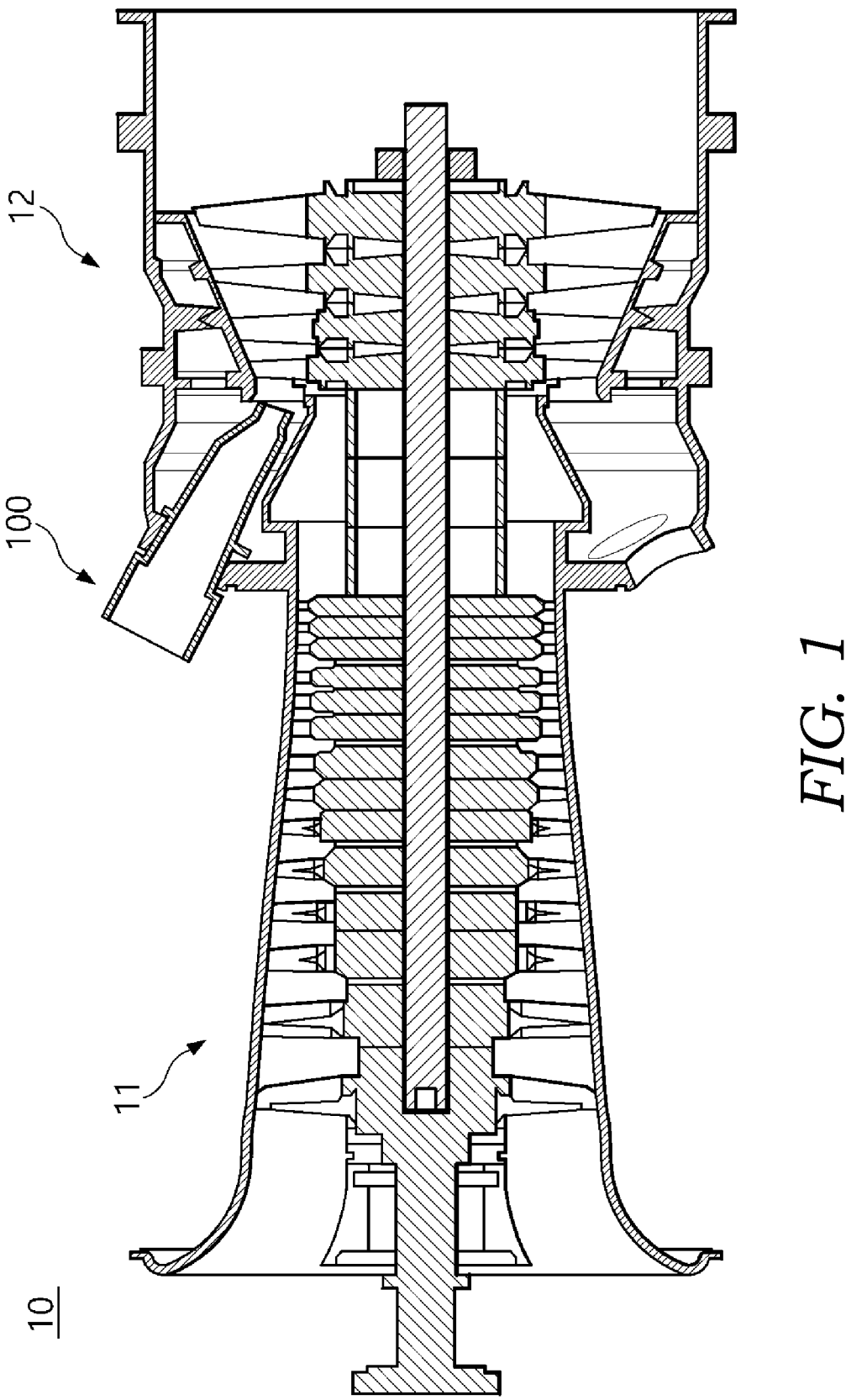
FIG. 1 is a cross-sectional view illustrating a gas turbine according to the present disclosure.

Referring to FIG. 1, a gas turbine 10 includes a compressor 11, a combustor 100, and a turbine 12. On the basis of a flow direction of gas (compressed air or combustion gas), the compressor 11 is disposed at an upstream side of the gas turbine 10, the turbine 12 is disposed at a downstream side of the gas turbine 10. In addition, the combustor 100 is disposed between the compressor 11 and the turbine 12.

The compressor 11 accommodates compressor vanes and compressor rotors in a compressor casing, and the turbine 12 accommodates turbine vanes and turbine rotors in a turbine casing. The compressor vanes and the compressor rotors are disposed in a multi-stage structure along the flow direction of compressed air, and the turbine vanes and the turbine rotors are also disposed in a multi-stage structure along the flow direction of combustion gas. In this case, the compressor 11 is designed such that an internal space thereof is gradually decreased in size from a front stage to a rear stage so that air intaken into the compressor 11 can be compressed. In contrast, the turbine 12 is designed such that an internal space thereof is gradually increased in size from a front stage to a rear stage so that combustion gas supplied from the combustor can expand.

Meanwhile, a torque tube functioning as a torque transmission member for transmitting rotational torque generated from the turbine 12 to the compressor 11 is disposed between the compressor rotor that is positioned at the rearmost stage of the compressor 11 and the turbine rotor that is positioned at the foremost stage of the turbine 12. As illustrated in FIG. 1, the torque tube may include a plurality of torque tube disks arranged in a three-stage structure, but this is only one of various embodiments of the present disclosure. Furthermore, the torque tube may include a plurality of torque tube disks arranged in a structure of equal to or more than four stages or a structure of equal to or less than two stages.

Each of the compressor rotors includes a compressor disk and compressor blades. In the compressor casing, a plurality of compressor disks (e.g. fourteen disks) is provided, and each of the compressor disks is coupled by a tie rod such that the compressor disks are not spaced apart from each other in an axial direction. In more detail, with the tie rod passing through each center portion of the compressor disks, each of the compressor disks is arranged along the axial direction. In addition, the compressor disks adjacent to each other are disposed such that facing surfaces of adjacent compressor disks are pressed by the tie rod so that the adjacent compressor disks cannot independently rotate.

A plurality of compressor blades is radially coupled to an outer circumferential surface of each of the compressor disks. In addition, a plurality of compressor vanes which is mounted in an annular shape on an inner circumferential surface of the compressor casing is disposed between the compressor blades on the basis of respective stages. Unlike the compressor disks, the compressor vanes are in a fixed state such that the compressor vanes do not rotate, and to align a flow of compressed air that has passed through the compressor blades and to guide the compressed air to the compressor blades which are positioned at the downstream side. In this case, in order to distinguish the compressor casing and the compressor vanes from the compressor rotors, the compressor casing and the compressor vanes may be comprehensively defined as a compressor stator.

The compressor stator may further include a compressor inlet scroll strut in addition to the compressor casing and the compressor vanes. The compressor inlet scroll strut is connected to the front stage of the compressor casing, and guides external air to the inlet of the compressor casing. Meanwhile, in the compressor vanes, a compressor vane located at the foremost stage is referred to as an inlet guide vane. The inlet guide vane serves to guide air flowing into the compressor casing to a compressor blade and a compressor vane disposed on a rear stage.

The tie rod is disposed such that the tie rod passes through center portions of the plurality of compressor disks and center portions of the turbine disks that will be described later. Furthermore, a first side end portion of the tie rod is fastened to an inside of the compressor disk that is positioned at the foremost side of the compressor 11, and a second side end portion of the tie rod is fastened by a fixing nut.

A shape of the tie rod is not limited to the shape illustrated in FIG. 1, and the tie rod may be formed in various structures according to the gas turbine. That is, a shape in which one tie rod is passing through the center portions of the compressor disks and the center portions of the turbine disks may be realized, another shape in which a plurality of tie rods is arranged in a circumferential direction may be realized, or a combination of the two shapes described above may be realized.

Although not illustrated, a deswirler functioning as a guide vane may be mounted in the compressor 11 of the gas turbine 10, in which the deswirler is configured to increase a pressure of fluid flowing into an inlet of the combustor 100 and to adjust a flow angle of the fluid to a designed flow angle.

High-temperature and high-pressure combustion gas discharged from the combustor 100 is supplied into the turbine 12 that is described above. The high-temperature and high-pressure combustion gas supplied into the turbine 12 expands while passing through an inner portion of the turbine 12, thereby applying impulsive force and reaction force to turbine blades to be described later so that rotational torque is generated. The rotational torque obtained in this manner is transmitted to the compressor 11 via the torque tube described above, and an additional rotation torque in excess of the torque required to drive the compressor 11 is used to drive a generator and so on.

The turbine 12 basically has a structure similar to that of the compressor 11. That is, the turbine 12 is also provided with a plurality of turbine rotors similar to the compressor rotors of the compressor 11. Accordingly, each of the turbine rotors 14 also includes a turbine disk and a plurality of turbine blades radially disposed around the turbine disk. A plurality of turbine vanes which is mounted in an annular shape in the turbine casing is provided between the turbine blades on the basis of respective stages. Furthermore, the turbine vanes guide the flow direction of the combustion gas passing through the turbine blades. In this case, in order to distinguish the turbine casing and the turbine vanes from the turbine rotor, the turbine casing and the turbine vanes may be comprehensively defined as a turbine stator.

Figure 2:
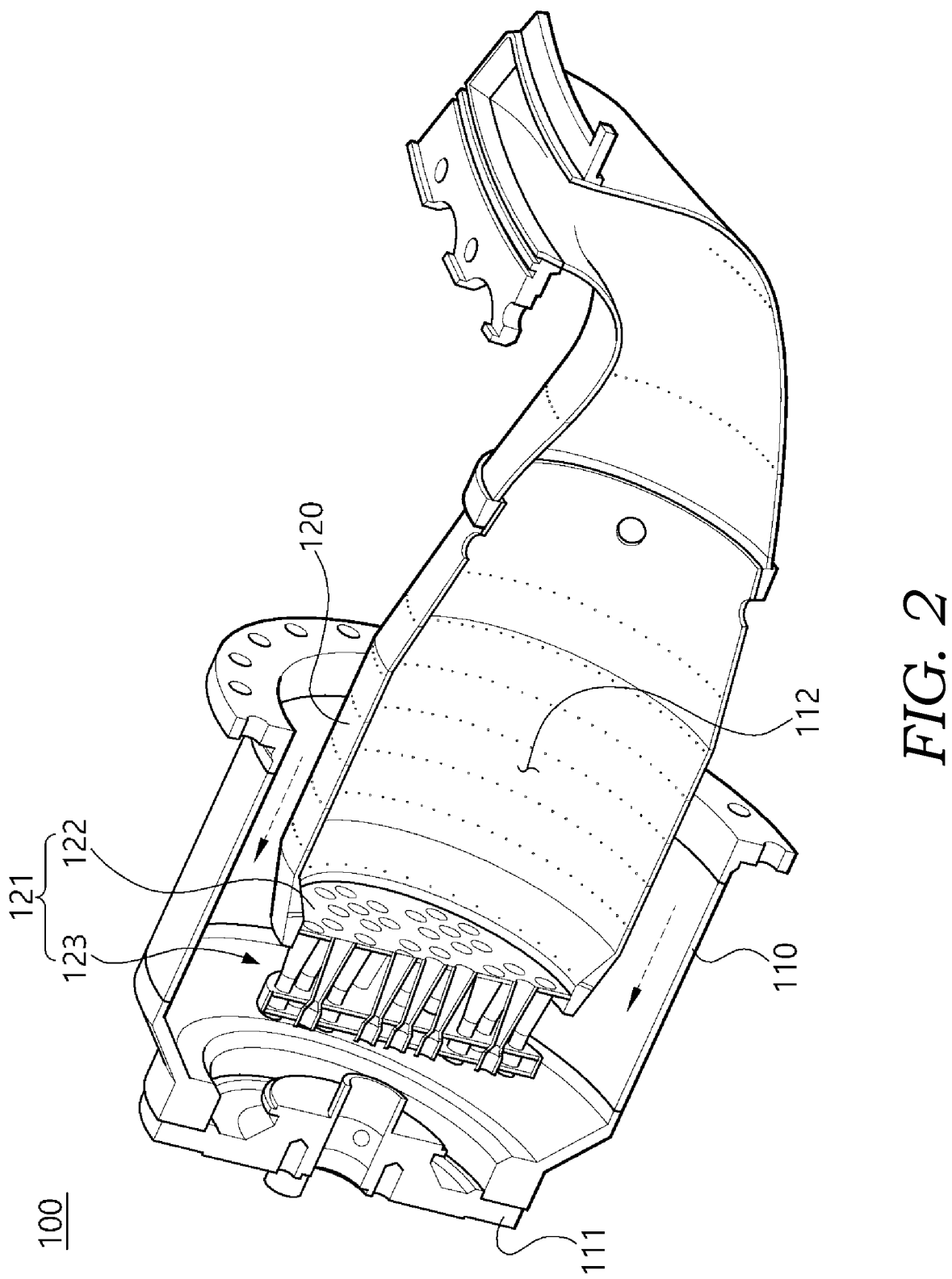
FIG. 2 is a cut-away perspective view of a combustor illustrated in FIG. 1.
Figure 3:
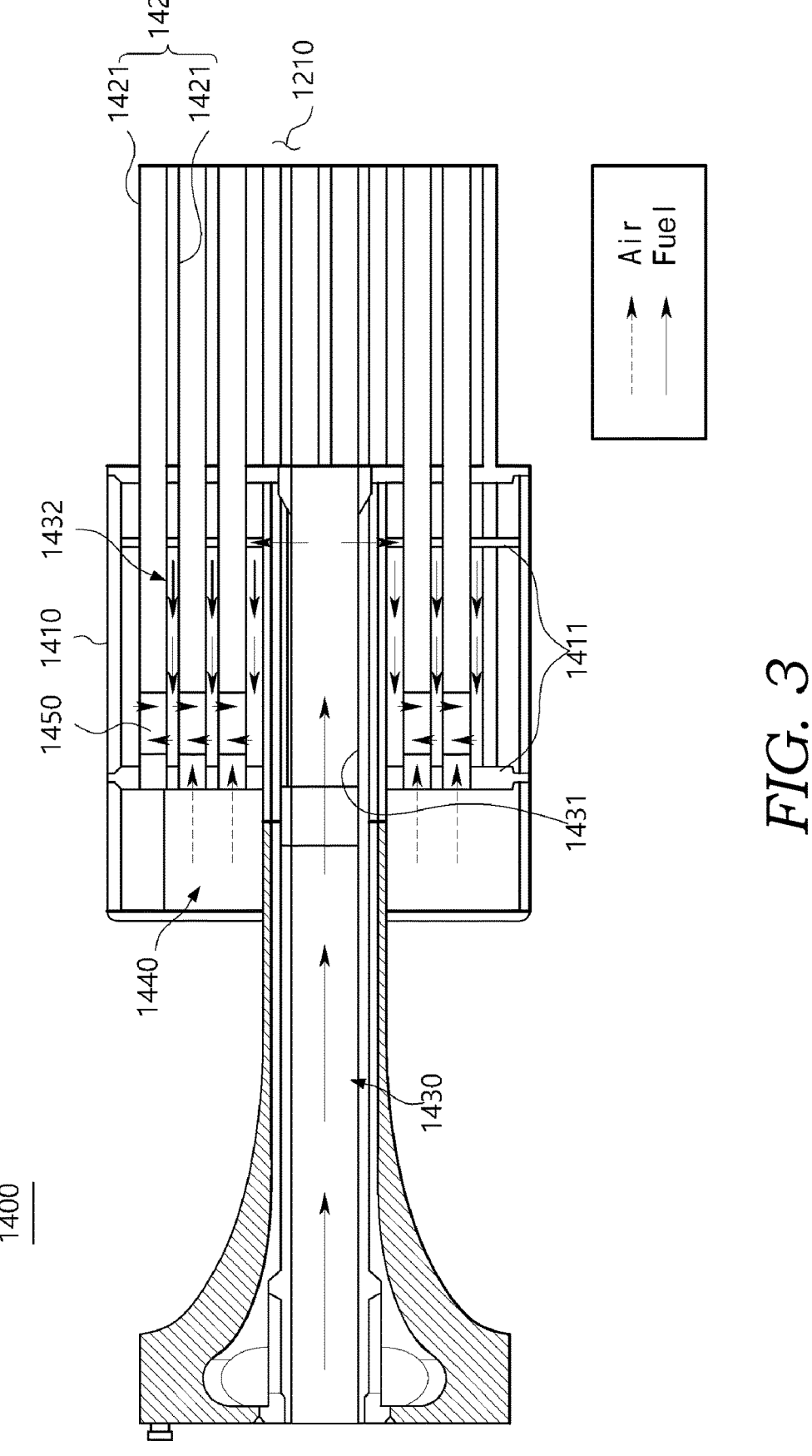
FIG. 3 is a cross-sectional view of a nozzle assembly according to a first embodiment of the present disclosure.
Figure 4:
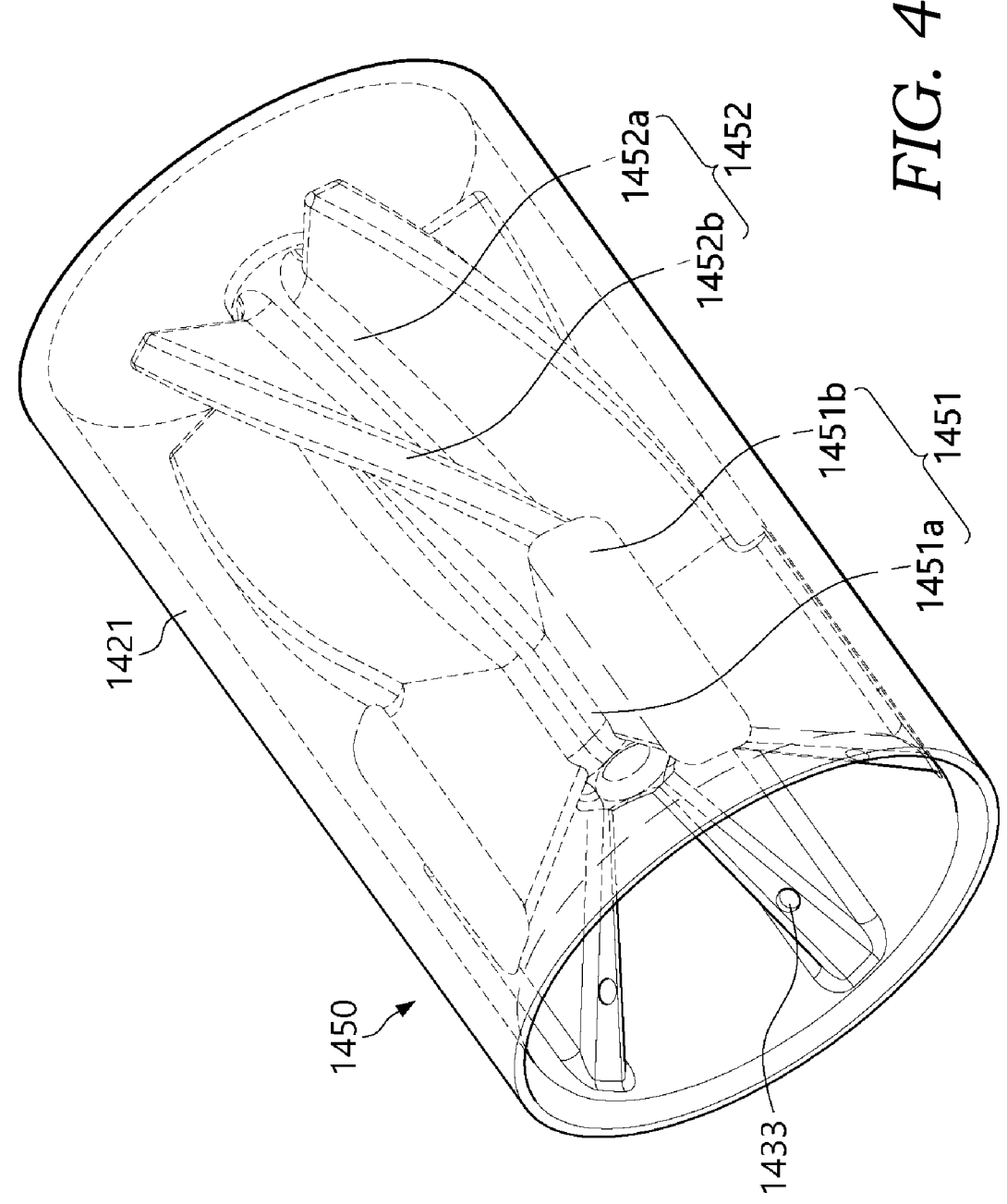
FIG. 4 is a perspective view of a mixing part of the nozzle assembly of according to the first embodiment of the present disclosure.
Figure 5:
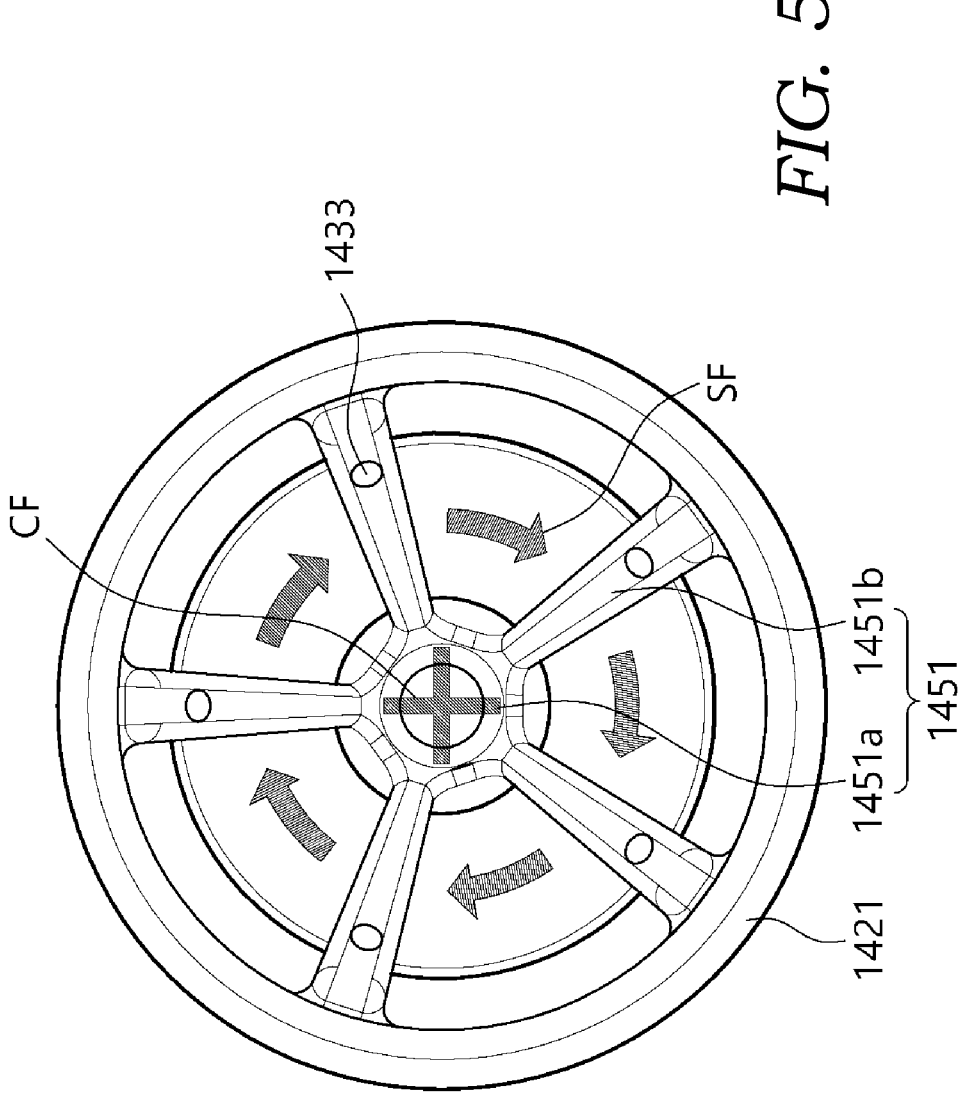
FIG. 5 is a front view of the mixing part of the nozzle assembly of according to the first embodiment of the present disclosure.
Figure 6:
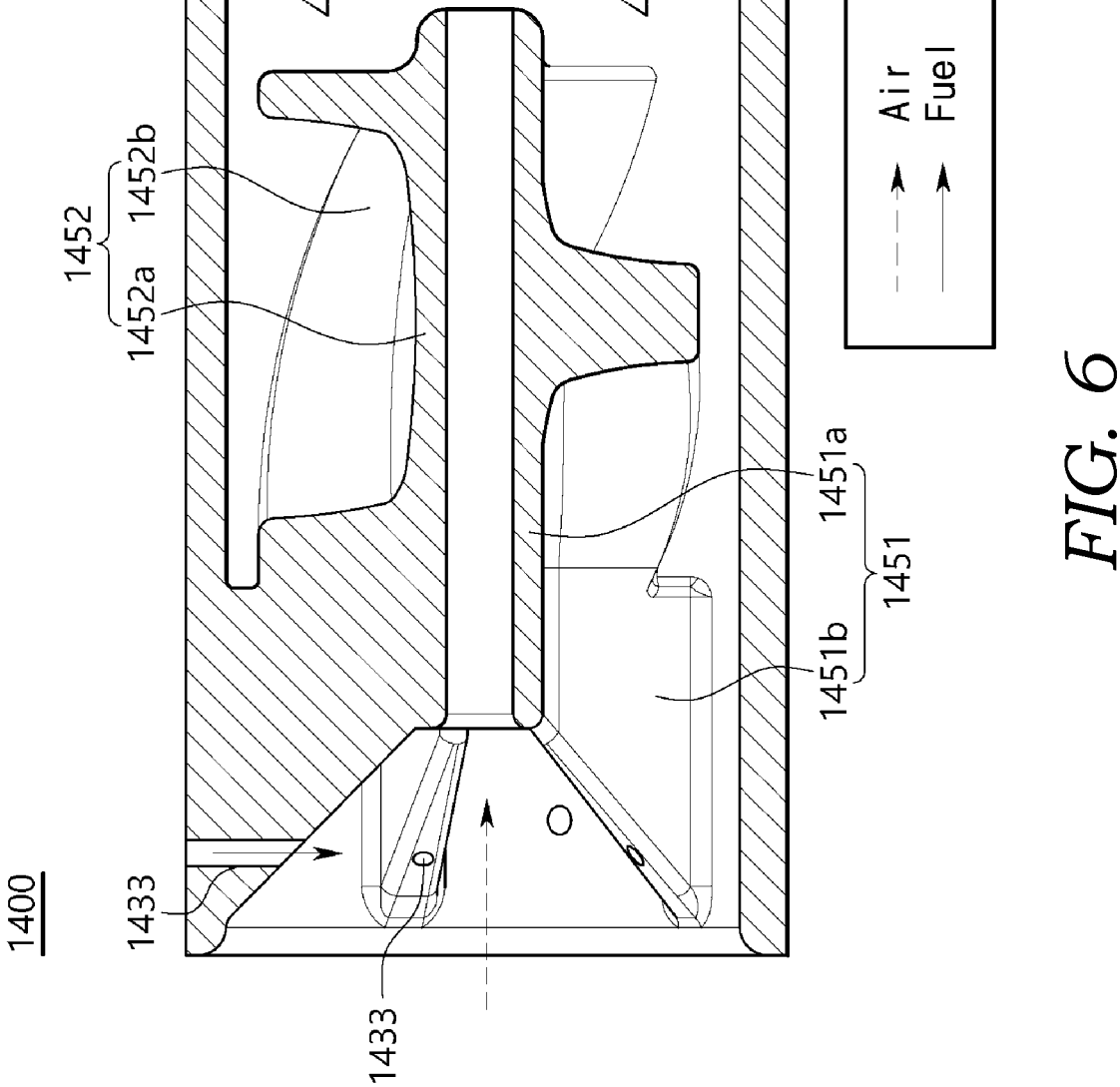
FIG. 6 is a cross-sectional view of the mixing part of the nozzle assembly of according to the first embodiment of the present disclosure.

Referring to FIG. 2, the combustor 100 according to the present disclosure includes an outer can 110, an outer head 111, an inner can 120, and an inner head 121. The outer can 110 is formed in the shape of a hollow cylinder, and receives fuel from the outside. The outer head 111 is provided on the front of the outer can 110 and covers the outer can 110. The inner can 120 is disposed inside the outer can 110 and is formed in the shape of a hollow cylinder. In addition, compressed air moves from the rear to the front between the inner can 120 and the outer can 110, and fuel and compressed air are injected into the inner can through the front. In addition, as the mixture of the fuel and compressed air injected into the inner can 120 combusts, the flame and combustion gas of high-temperature and high-pressure are generated. Here, space in which combustion occurs inside the inner can 120 is called a combustion chamber 1210. The inner head 121 is installed on the front of the inner can 120, mixes the fuel and compressed air which are supplied thereinto, and supplies the fuel and compressed air to the inside of the inner can 120.

The inner head 121 includes a head plate 122 and a plurality of nozzle assemblies 123. The head plate 122 covers the front of the inner can 120. The plurality of nozzle assemblies 123 is installed on the front of the head plate 122, and mixes fuel and compressed air and supplies the fuel and compressed air to the rear of the head plate.

The nozzle assemblies 123 are installed in a structure in which one nozzle group is disposed in the central portion of the head plate 122, and a plurality of remaining nozzle groups is located at a radial outer side of the one nozzle group of the central portion to surround the one nozzle group.

Referring to FIGS. 3 to 6, the nozzle assembly 1400 according to the first embodiment of the present disclosure includes a nozzle frame 1410, a mixture supply tube 1420, a fuel supply part 1430, an air supply part 1440, and a mixing part 1450.

The nozzle frame 1410 is formed in the form of a hollow tube, and includes the mixture supply tube 1420, the fuel supply part 1430, the air supply part 1440, a return member 1432, and the mixing part 1450 disposed therein.

The mixture supply tube 1420 includes a plurality of tubes 1421. A first end of each of the tubes 1421 is connected to the air supply part 1440, and a second end of the tube 1421 communicates with the combustion chamber 1210.

The tube 1421 supplies a mixture generated by mixing fuel supplied to the tube 1421 and air supplied from the air supply part 1440 to the combustion chamber 1210.

In addition, the tube 1421 is supported by a pair of tube seats 1411 arranged by being spaced apart from each other along a longitudinal direction of the tube 1421.

The fuel supply part 1430 includes a fuel supply tube 1431 provided longitudinally in the center of the nozzle frame 1410, and the return member 1432 disposed at the outside of the fuel supply tube.

The fuel supply tube supplies fuel from the upstream side (a left side of FIG. 3) of the nozzle frame 1410 to the downstream side (a right side of FIG. 3) of the nozzle frame.

The fuel may be hydrogen. In this embodiment, hydrogen is used as the fuel, but other fuels other than hydrogen, such as LNG, may also be applied.

The return member 1432 moves fuel moved to the downstream side (the right side of FIG. 3) of the nozzle frame in the fuel supply tube to the upstream side of the nozzle frame 1410, and then supplies to the tubes 1421 of the mixture supply tube 1420. The return member 1432 may be configured as a member that defines a space between the tubes.

The air supply part 1440 is formed on the upstream side of the tubes 1421. The air supply part 1440 supplies air supplied from the outside of the nozzle assembly to the tubes 1421. The air may be compressed air supplied from the compressor.

The mixing part 1450 includes an injection member 1451 and a swirl vane 1452.

The injection member 1451 is formed inside the tube 1421 and injects fuel supplied from the fuel supply part 1430 toward air passing through the tube 1421.

The injection member 1451 includes a first hollow tube 1451*a* and supports 1451*b*, and has a central flow path formed in the center of the tube 1421 so that the mixture of fuel and air can flow to the center of the tube 1421 along an axial direction thereof.

The first hollow tube 1451*a* is disposed along the axis of the tube 1421 in the center of the tube 1421 and is formed in a tube being hollow inside to constitute a flow path of the mixture of fuel and air.

Each of the supports 1451*b* has a first end connected to the first hollow tube 1451*a*, and a second end connected to the tube 1421, and supports the first hollow tube 1451*a*.

The support 1451*b* includes a plurality of supports, and the plurality of supports is formed in radial shapes outward from the first hollow tube 1451*a*. The supports 1451*b* include five supports and are disposed at equal intervals of 72° from each other relative to the center of the first hollow tube.

A fuel injection hole 1433 configured to allow the return member 1432 and the inside of the tube 1421 to communicate with each other is formed in an upstream surface of the support 1451*b* of the injection member 1451, and thus fuel moving through the return member 1432 is supplied into the tube 1421.

The supports 1451*b* are disposed at equal angles 72° with respect to the center of the tube 1421 so that the supports can evenly supply fuel to the entire area of the tube 1421. In this embodiment, it has been described that there are five supports, but the number of the supports may be changed depending on design conditions.

The swirl vane 1452 includes a second hollow tube 1452*a* and a plurality of blades 1452*b*.

The second hollow tube 1452*a* is formed as a hollow tube having a communication path formed in a center thereof, with the communication path communicating with the first hollow tube 1451*a*. The second hollow tube 1452*a* is formed at the downstream side of the injection member and is disposed in the center of the tube.

The plurality of blades is formed in spiral shapes on the outer circumferential surface of the second hollow tube 1452*a*. The blades 1452*b* allow fuel and air supplied through the outside of the first hollow tube to form a spiral flow (SF) so that the fuel and air can mix with each other.

The spiral flow (SF) generated by the blades is formed at a slower speed than a central flow (CF) generated in a central flow path formed in the center of the first and second hollow tubes. That is, as for the mixture of this embodiment, the central flow (CF) and the outer spiral flow (SF) are formed at different speeds, thereby further improving the mixing efficiency of fuel and air.

Due to this improvement in mixing efficiency, in the nozzle assembly 1400 according to the first embodiment of the present disclosure, the overall length of the tube is decreased, and thus the overall size of the combustor can be decreased, and the generation of nitrogen oxides can also be reduced.

Figure 7:
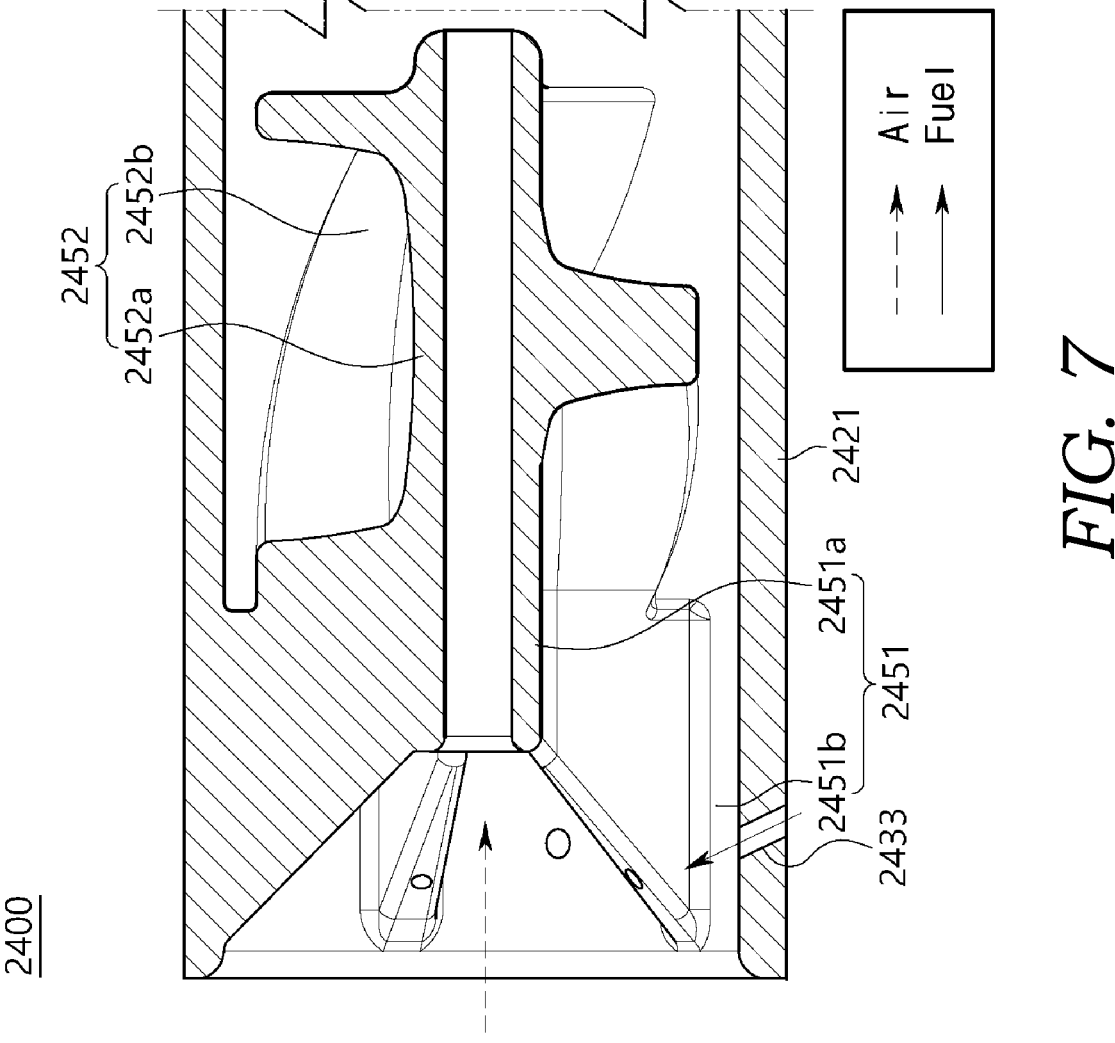
FIG. 7 is a cross-sectional view of a mixing part according to a second embodiment of the present disclosure.

FIG. 7 is a cross-sectional view of a mixing part according to a second embodiment of the present disclosure the nozzle assembly.

Referring to FIG. 7, a nozzle assembly 2400 according to the second embodiment of the present disclosure includes a nozzle frame, a mixture supply tube, a fuel supply part, an air supply part, and a mixing part.

A fuel supply hole 2433 according to the second embodiment of the present disclosure is formed in the inner wall of the tube 2421. In the nozzle assembly 2400 according to the second embodiment of the present disclosure, configurations other than a configuration related to the fuel supply hole 2433 are the same as the configurations of the nozzle assembly according to the first embodiment described above and thus description thereof will be omitted.

The fuel supply hole 2433 allows the fuel supply part and the tube 2421 to communicate with each other so that fuel of the fuel supply part is injected into the tube 2421. The inner wall of the tube 2421 may include a movement space having a first end communicating with the fuel supply part and a second end communicating with the fuel supply hole 2433 so that the fuel of the fuel supply part 1430 is supplied to the fuel supply hole 2433.

In addition, the fuel supply hole 2433 may be formed by inclining the central axis of the fuel supply hole with respect to the central axis of the tube 2421 so that fuel can be supplied to a side into which air flows. Accordingly, fuel supplied through the fuel supply hole 2433 and air collide with each other to form a vortex so that mixing of the fuel and air can be further improved.

Figure 8:
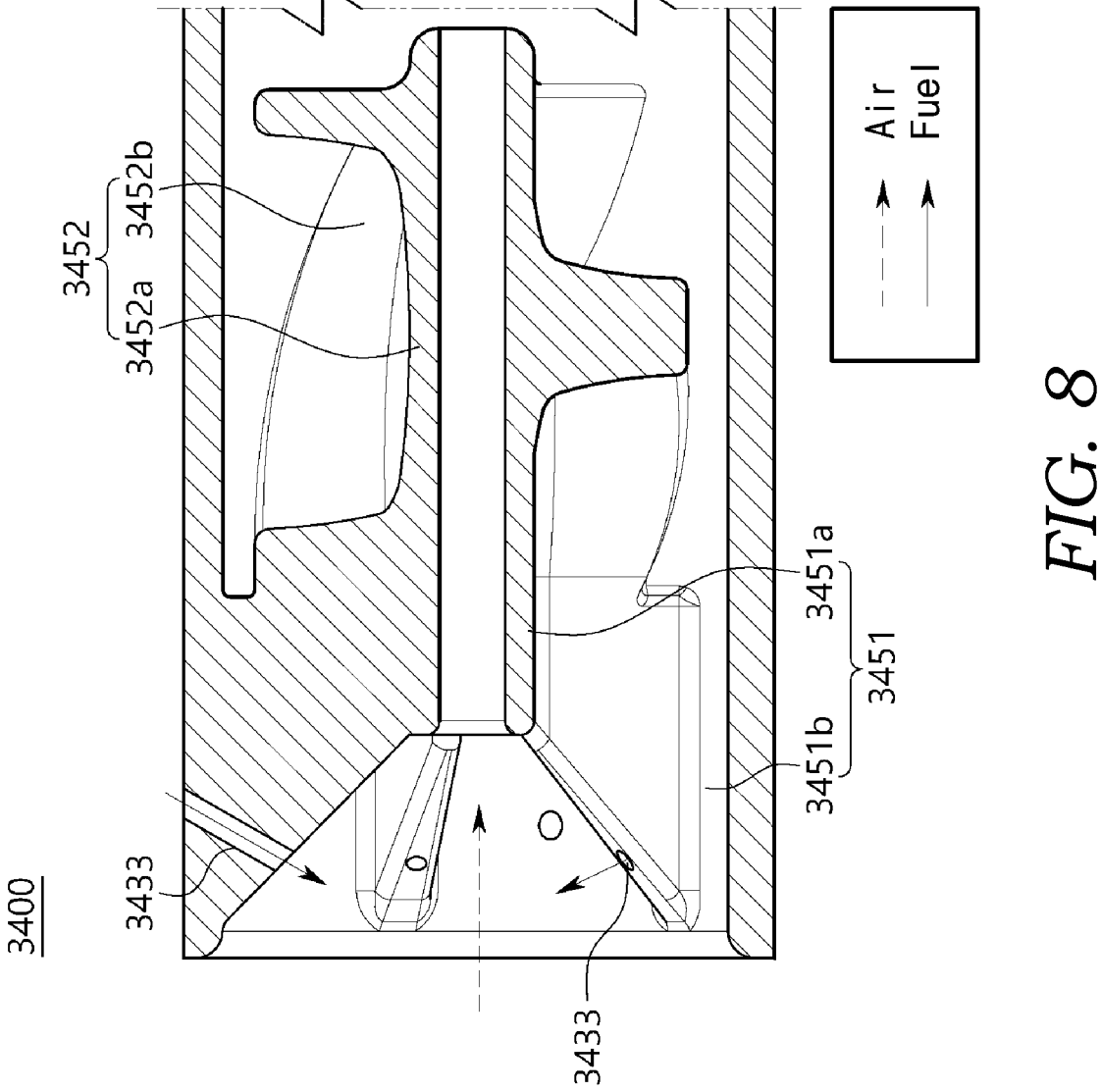
FIG. 8 is a cross-sectional view of a mixing part according to a third embodiment of the present disclosure.

FIG. 8 is a cross-sectional view of a nozzle assembly according to a third embodiment of the present disclosure.

Referring to FIG. 8, the nozzle assembly 3400 according to the third embodiment of the present disclosure includes a nozzle frame, a mixture supply tube, a fuel supply part, an air supply part, and a mixing part.

An injection member 3451 according to the third embodiment of the present disclosure includes a first hollow tube 3451a and a plurality of supports 3451b formed inside the tube 3421, and a fuel injection hole 3433 configured to allow the return member 3432 and the inside of the tube 3421 to communicate with each other is formed in an upstream surface of each of the supports 3451b of the injection member 3451, and thus fuel moving through the return member 3432 is supplied into the tube 3421.

In the nozzle assembly 3400 according to the third embodiment of the present disclosure, configurations other than a configuration related to the fuel injection hole 3433 are the same as the configurations of the nozzle assembly according to the first embodiment described above and thus description thereof will be omitted.

The central axis of the fuel injection hole 3433 is inclined with respect to the central axis of the tube 3421 so that fuel injected through the fuel injection hole 3433 is injected toward the center of the tube 3421.

In addition, fuel injected through the fuel injection hole 3433 collides with air supplied from the upstream side of the tube and is primarily mixed with the air, thereby further improving mixing efficiency.

The present disclosure has been described with reference to the embodiments illustrated in the drawings, but these embodiments are merely illustrative, and those skilled in the art will understand that various modified embodiments and equivalent other embodiments are possible therefrom. Therefore, the scope of technical protection of the present disclosure should be determined by the technical spirit of the attached claims.

What is claimed:

1. A nozzle assembly configured to inject fuel and compressed air into a combustion chamber of a combustor of a gas turbine, the nozzle assembly comprising:
   a hollow nozzle frame;
   a mixture supply tube having a plurality of tubes configured to supply a mixture of the compressed air and the fuel to the combustion chamber;
   a fuel supply part configured to supply the fuel to the mixture supply tube;

an air supply part configured to supply the compressed air to the mixture supply tube; and
   a mixing part comprising:
   an injection member formed in each of the plurality of tubes and configured to inject the fuel supplied from the fuel supply part into a respective tube of the plurality of tubes and toward the compressed air passing through the respective tube, with the injection member comprising a first hollow tube having a central flow path, through which the fuel and the compressed air flows, formed therein; and
   a swirl vane formed on one side of the injection member, with the swirl vane having a flow path formed in a center thereof such that the flow path communicates with the central flow path of the first hollow tube and having blades formed on an outer surface thereof so that the fuel and the compressed air supplied from an outside of the first hollow tube mix with each other,
   wherein the injection member comprises:
   the first hollow tube disposed in a center of the respective tube; and
   a plurality of supports formed in radial shapes extending outward from the first hollow tube and in contact with the respective tube,
   wherein a fuel injection hole configured to inject the fuel supplied from the fuel supply part in a direction opposite to a flow direction of the compressed air supplied from the air supply part and is formed in an upstream part of each of the supports,
   wherein a central axis of the fuel injection hole is formed to be inclined at an angle with respect to a central axis of the respective tube so that the fuel is injected toward the center of the respective tube,
   wherein the swirl vane comprises:
      a second hollow tube communicating with the first hollow tube; and
      a plurality of blades formed in spiral shapes on an outer circumferential surface of the second hollow tube,
   wherein the central axis of the fuel injection hole extends from an exterior surface of the respective tube to an exterior surface of the upstream part of a respective support of the supports at the angle.

2. The nozzle assembly of claim 1, wherein the fuel supply part comprises:
   a fuel supply tube disposed in a center of the hollow nozzle frame and formed along a longitudinal direction of the hollow nozzle frame; and
   a return member configured to move fuel supplied through the fuel supply tube to a rear side of the hollow nozzle frame.

3. The nozzle assembly of claim 2, wherein the fuel injection hole configured to allow the return member and the inside of the respective tube to communicate with each other and is formed in the injection member so that the fuel supplied through the return member flows into the respective tube.

4. The nozzle assembly of claim 1, wherein the supports comprise five supports and are disposed at equal angles from each other.

5. The nozzle assembly of claim 1, wherein a fuel supply hole configured to allow the fuel supply part and the respective tube to communicate with each other and to supply the fuel of the fuel supply part to the respective tube is formed in the respective tube.

6. The nozzle assembly of claim 5, wherein a central axis of the fuel supply hole is formed to be inclined with respect to the central axis of the respective tube so that the fuel is injected toward the center of the respective tube.

7. A combustor configured to mix compressed air supplied from a compressor of a gas turbine with fuel and to combust a mixture of the compressed air and the fuel, the combustor being configured to supply a generated combustion gas to a turbine of the gas turbine, and the combustor comprising:

a nozzle casing;

a liner connected to an end portion of the nozzle casing adjacent to the turbine, the liner having an inner portion provided with a combustion chamber in which the mixture of the compressed air and the fuel is combusted;

a transition piece connected to an end portion of the liner adjacent to the turbine, the transition piece being configured to supply the generated combustion gas generated from the combustion chamber to the turbine; and a nozzle assembly mounted inside the nozzle casing and configured to inject the fuel and the compressed air into the combustion chamber, wherein the nozzle assembly comprises:

a hollow nozzle frame;

a mixture supply tube having a plurality of tubes configured to supply the mixture of the compressed air and the fuel to the combustion chamber;

a fuel supply part configured to supply fuel to the mixture supply tube;

an air supply part configured to supply the compressed air to the mixture supply tube; and a mixing part comprising:

an injection member formed in each of the plurality of tubes and configured to inject the fuel supplied from the fuel supply part into a respective tube of the plurality of tubes and toward the compressed air passing through the respective tube, with the injection member comprising a first hollow tube having a central flow path, through which the fuel and the compressed air flows, formed therein; and a swirl vane formed on one side of the injection member, with the swirl vane having a flow path formed in a center thereof such that the flow path communicates with the central flow path of the first hollow tube and having blades formed on an outer surface thereof so that the fuel and the compressed air supplied from an outside of the first hollow tube mix with each other, wherein the injection member comprises:

the first hollow tube disposed in a center of the respective tube; and a plurality of supports formed in radial shapes extending outward from the first hollow tube and in contact with the respective tube, wherein a fuel injection hole configured to inject the fuel supplied from the fuel supply part in a direction opposite to a flow direction of the compressed air supplied from the air supply part and is formed in an upstream part of each of the supports, wherein a central axis of the fuel injection hole is formed to be inclined at an angle with respect to a central axis of the respective tube so that the fuel is injected toward the center of the respective tube, wherein the swirl vane comprises:

a second hollow tube communicating with the first hollow tube; and a plurality of blades formed in spiral shapes on an outer circumferential surface of the second hollow tube, wherein the central axis of the fuel injection hole extends from an exterior surface of the respective tube to an exterior surface of the upstream part of a respective support of the supports at the angle.

8. The combustor of claim 7, wherein a fuel supply hole configured to allow the fuel supply part and the respective tube to communicate with each other and to supply the fuel of the fuel supply part to the respective tube is formed in the respective tube, and a central axis of the fuel supply hole is formed to be inclined with respect to the central axis of the respective tube so that the fuel is injected toward the center of the respective tube.

9. A gas turbine comprising:

a compressor configured to compress air introduced from outside;

a combustor configured to mix compressed air supplied from the compressor with fuel and to combust a mixture of the compressed air and the fuel; and a turbine configured to generate power for generating electric power by passing a generated combustion gas supplied from the combustor through an inner portion of the turbine, wherein the combustor comprises:

a nozzle casing;

a liner connected to an end portion of the nozzle casing adjacent to the turbine, the liner having an inner portion provided with a combustion chamber in which the mixture of the compressed air and the fuel is combusted;

a transition piece connected to an end portion of the liner adjacent to the turbine, the transition piece being configured to supply the generated combustion gas supplied from the combustion chamber to the turbine; and a nozzle assembly mounted inside the nozzle casing and configured to inject the fuel and the compressed air into the combustion chamber, wherein the nozzle assembly comprises:

a hollow nozzle frame;

a mixture supply tube having a plurality of tubes configured to supply the mixture of the compressed air and the fuel to the combustion chamber;

a fuel supply part configured to supply the fuel to the mixture supply tube;

an air supply part configured to supply the compressed air to the mixture supply tube; and a mixing part comprising:

an injection member formed in each of the plurality of tubes and configured to inject the fuel supplied from the fuel supply part into a respective tube of the plurality of tubes and toward the compressed air passing through the respective tube, with the injection member comprising a first hollow tube having a central flow path, through which the fuel and the compressed air flows, formed therein; and a swirl vane formed on one side of the injection member, with the swirl vane having a flow path formed in a center thereof such that the flow path communicates with the central flow path of the first hollow tube and having blades formed on an outer surface thereof so that the fuel and the compressed air supplied from an outside of the first hollow tube mix with each other, wherein the injection member comprises:

the first hollow tube disposed in a center of the respective tube; and a plurality of supports formed in radial shapes extending outward from the first hollow tube and in contact with the respective tube, wherein a fuel injection hole configured to inject the fuel supplied from the fuel supply part in a direction opposite to a flow direction of the compressed air supplied from the air supply part and is formed in an upstream part of each of the supports, wherein a central axis of the fuel injection hole is formed to be inclined at an angle with respect to a central axis of the respective tube so that the fuel is injected toward the center of the respective tube, wherein the swirl vane comprises:

a second hollow tube communicating with the first hollow tube; and a plurality of blades formed in spiral shapes on an outer circumferential surface of the second hollow tube, wherein the central axis of the fuel injection hole extends from an exterior surface of the respective tube to an exterior surface of the upstream part of a respective support of the supports at the angle.

10. The gas turbine of claim 9, wherein a fuel supply hole configured to allow the fuel supply part and the respective tube to communicate with each other and to supply the fuel of the fuel supply part to the respective tube is formed in the respective tube, and the central axis of the fuel supply hole is formed to be inclined with respect to a central axis of the respective tube so that the fuel is injected toward the center of the respective tube.

* * * * *